United States Patent
Batchelder

(10) Patent No.: US 12,128,608 B2
(45) Date of Patent: Oct. 29, 2024

(54) THERMAL CONTROL IN A STEREOLITHOGRAPHIC 3D PRINTER

(71) Applicant: Stratasys, Inc., Eden Prairie, MN (US)

(72) Inventor: J. Samuel Batchelder, Woodinville, WA (US)

(73) Assignee: Stratasys, Inc., Eden Prairie, MN (US)

( * ) Notice: Subject to any disclaimer, the term of this patent is extended or adjusted under 35 U.S.C. 154(b) by 279 days.

(21) Appl. No.: 17/543,369

(22) Filed: Dec. 6, 2021

(65) Prior Publication Data

US 2022/0176623 A1    Jun. 9, 2022

Related U.S. Application Data

(60) Provisional application No. 63/121,457, filed on Dec. 4, 2020.

(51) Int. Cl.
| | |
|---|---|
| B29C 64/188 | (2017.01) |
| B29C 64/124 | (2017.01) |
| B29C 64/20 | (2017.01) |
| B33Y 10/00 | (2015.01) |
| B33Y 30/00 | (2015.01) |

(52) U.S. Cl.
CPC .......... *B29C 64/124* (2017.08); *B29C 64/188* (2017.08); *B29C 64/20* (2017.08); *B33Y 10/00* (2014.12); *B33Y 30/00* (2014.12)

(58) Field of Classification Search
CPC ... B29C 64/124; B29C 64/129; B29C 64/135; B29C 64/118; B29C 64/20; B29C 64/188; B29C 64/30; B29C 64/364; B29C 64/393; B33Y 10/00; B33Y 30/00; B33Y 40/20; B33Y 50/02

See application file for complete search history.

(56) References Cited

U.S. PATENT DOCUMENTS

| | | |
|---|---|---|
| 6,977,714 B2 | 12/2005 | Finders |
| 9,782,934 B2 | 10/2017 | Willis et al. |
| 10,150,280 B2 | 12/2018 | Aghababaie et al. |
| 10,166,725 B2 | 1/2019 | Willis et al. |
| 10,213,956 B2 | 2/2019 | Willis et al. |

(Continued)

FOREIGN PATENT DOCUMENTS

| | | |
|---|---|---|
| EP | 2996852 A1 | 3/2016 |
| EP | 2996852 A4 | 3/2017 |

(Continued)

*Primary Examiner* — Jamel M Nelson
(74) *Attorney, Agent, or Firm* — Peter J. Ims; Westman, Champlin & Koehler, P.A.

(57) ABSTRACT

A method for printing a 3D part in a layer-wise manner includes providing a pool of polymerizable liquid in a vessel over a build window and positioning a downward-facing build platform in the pool, thereby defining a build region above the build window. The method includes selectively curing a volume of polymerizable liquid in the build region by imparting electromagnetic radiation through the build window to form a printed layer of the part adhered to the build platform and actively cooling the build window to remove energy imparted by the electromagnetic radiation and the polymerization reaction of the polymerizable liquid such that the printed layer is between about 1° C. and about 30° C. below an average part temperature prior to raising the print layer and printing the next layer.

24 Claims, 9 Drawing Sheets

(56) References Cited

U.S. PATENT DOCUMENTS

| | | |
|---|---|---|
| 10,245,785 B2 | 4/2019 | Adzima |
| 10,252,468 B2 | 4/2019 | Greene et al. |
| 10,354,445 B2 | 7/2019 | Greene et al. |
| 10,421,233 B2 | 9/2019 | Lin et al. |
| 10,464,259 B2 | 11/2019 | Lin et al. |
| 10,723,068 B2 | 7/2020 | Vadder |
| 10,780,641 B2 | 9/2020 | Greene et al. |
| 10,780,643 B2 | 9/2020 | Greene et al. |
| 11,151,292 B2 | 10/2021 | Laaker et al. |
| 11,351,735 B2 | 6/2022 | Greene et al. |
| 2014/0339741 A1 | 11/2014 | Aghababaie et al. |
| 2015/0360419 A1 | 12/2015 | Willis et al. |
| 2016/0067921 A1 | 3/2016 | Willis et al. |
| 2017/0102679 A1 | 4/2017 | Greene et al. |
| 2017/0182708 A1 | 6/2017 | Lin et al. |
| 2017/0291360 A1 | 10/2017 | Franke et al. |
| 2017/0326807 A1 | 11/2017 | Greene et al. |
| 2018/0056608 A1* | 3/2018 | Dunn ................ B29C 64/118 |
| 2018/0086003 A1 | 3/2018 | Greene et al. |
| 2018/0290374 A1 | 10/2018 | Willis et al. |
| 2018/0333911 A1 | 11/2018 | Lin et al. |
| 2018/0333912 A1 | 11/2018 | Lin et al. |
| 2018/0333913 A1 | 11/2018 | Lin et al. |
| 2018/0348646 A1 | 12/2018 | Lin et al. |
| 2018/0361666 A1 | 12/2018 | Adzima |
| 2019/0134886 A1 | 5/2019 | Willis et al. |
| 2019/0176398 A1 | 6/2019 | Adzima |
| 2019/0322033 A1 | 10/2019 | Willis et al. |
| 2020/0004707 A1 | 1/2020 | Pirzadeh |
| 2020/0023587 A1 | 1/2020 | Greene et al. |
| 2020/0031044 A1 | 1/2020 | Lin et al. |
| 2020/0303997 A1 | 9/2020 | Brinkmann et al. |
| 2020/0331209 A1* | 10/2020 | Ong ................ B29C 64/129 |
| 2021/0117581 A1 | 4/2021 | Laaker et al. |
| 2021/0387420 A1 | 12/2021 | Greene et al. |
| 2021/0394449 A1 | 12/2021 | Kostenko |
| 2022/0032372 A1 | 2/2022 | Magwood et al. |
| 2022/0100915 A1 | 3/2022 | Laaker et al. |

FOREIGN PATENT DOCUMENTS

| | | |
|---|---|---|
| EP | 2996852 B1 | 5/2018 |
| GB | 2514139 A | 11/2014 |
| GB | 2559914 A | 8/2018 |
| GB | 2564956 A | 1/2019 |
| GB | 2564956 B | 4/2020 |
| WO | 2014186463 A1 | 11/2014 |
| WO | 2017062630 A1 | 4/2017 |
| WO | 2019129561 A1 | 7/2019 |
| WO | 2019139561 A1 | 7/2019 |
| WO | 2020005706 A1 | 1/2020 |
| WO | 2020064479 A1 | 1/2020 |
| WO | 2020064779 A1 | 4/2020 |
| WO | 2020139858 A1 | 7/2020 |
| WO | 2020167665 A1 | 8/2020 |

\* cited by examiner

THERMAL CONTROL IN A STEREOLITHOGRAPHIC 3D PRINTER

CROSS-REFERENCE TO RELATED APPLICATION

The present application is based on and claims the benefit of U.S. provisional patent application Ser. No. 63/121,457, filed Dec. 4, 2020, the content of which is hereby incorporated by reference in its entirety.

BACKGROUND

The present disclosure relates to additive manufacturing systems for printing 3D parts utilizing vat curing of photopolymers with optical energy. In particular, the present disclosure relates to a bottom-up stereolithographic (SL) 3D printer having thermal control and methods for printing parts using the bottom-up SL 3D printer with active cooling.

Additive manufacturing, also called 3D printing, is generally a process in which a three-dimensional (3D) object is built by adding material to form a part rather than subtracting material as in traditional machining. Using one or more additive manufacturing techniques, a three-dimensional solid object of virtually any shape can be printed from a digital model of the object by an additive manufacturing system, commonly referred to as a 3D printer. A typical additive manufacturing work flow includes slicing a three-dimensional computer model into thin cross sections defining a series of layers, translating the result into two-dimensional position data, and feeding the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic (SL) vat curing processes that cure photopolymers in a vat from the top down or from the bottom up.

Bottom-up stereolithographic 3D printers selectively cure a photopolymerizable liquid provided in a vat or tray on a downward-facing build platform by emitting patterns of electromagnetic radiation from a programmable light source through a build window located beneath the resin to produce solid layers. The build platform is lifted as new layers are formed. Generally, a bottom-up vat printer includes a tray filled with a pool of photopolymerizable liquid resin. The tray has an optically transparent window in the bottom, and an imaging source, e.g., a digital light processor (DLP), a liquid crystal display (LCD) or a scanning laser beam, that transmits light upwards though the window and causes the liquid to polymerize. A curing platform is placed into the pool of liquid and is utilized to raise the part being printed away from the window in a layer-wise manner. The distance between the part surface and the window or a separation membrane located above the window defines a thickness of the next layer. In some embodiments, a stereolithographic printer can utilize includes a digital light processing (DLP) projector that emits optical energy in the form of a projected image area in a wavelength or band of wavelengths and with sufficient power to cause the liquid to react and form a polymerized layer. The cured layer is then separated from the window and the curing platform raised a distance of a layer, and the process is repeated until the part is completely printed.

Various programmable light sources may be used to emit optical energy. The main varieties of light sources are: lasers, digital light processing (DLP) projectors, and LCD's. Lasers are directed by galvanometers to scan across the build window along cure paths. DLP projectors use an LED modulated by a digital micromirror device (DMD) to selectively generate and flash images of whole layers onto the bottom of the vat. LCD also flashes complete layers at the resin tank, but with the UV light coming from an array of LEDs shining through an LCD, not a projector.

In general, the optical images projected onto the part build surface are absorbed within a few tens of microns of the surface, causing the absorbing polymers to heat. As the photopolymerizable liquids cure and cross-link, additional heat is released from the exothermic reaction. The heat produces a temperature rise, with the positive effect of further accelerating the reaction rate.

However, the rise in temperature can also have negative effects. If the temperature gets sufficiently high, the solidified part material near the part build surface will soften. The softened, solidified material is more prone to be distorted or damaged by the subsequent processes associated with applying additional polymer layers, such as peeling the cured layer from the window. Further, the solidified part material near the part build surface generally expands as it heats. Especially on large parts, elevated temperatures can introduce geometric distortion and strain effects (such as curl). Finally, if the temperature of the pool is sufficiently high, the warmed monomer can introduce bubbles or other build deformities into the most recently cured layer, as well as experiencing overall material degradation.

There exists a need to adequately control and maintain the temperature of the part being printed that allows a vat polymerization 3D printer to print larger parts, regardless of part feature size or geometry, even at high printing speeds.

SUMMARY

An aspect of the present disclosure includes a method for printing a 3D part in a layer-wise manner. The method includes providing a pool of polymerizable liquid in a vessel over a build window and positioning a downward-facing build platform in the pool, thereby defining a build region above the build window. The method includes selectively curing a volume of polymerizable liquid in the build region by imparting electromagnetic radiation through the build window to form a printed layer of the part adhered to the build platform and actively cooling the build window to remove energy imparted by the electromagnetic radiation and the polymerization reaction of the polymerizable liquid such that the printed layer is between about 1° C. and about 30° C. below an average part temperature. The method includes separating the cooled printed layer from the top surface of the build window and raising the build platform to a height of a next layer to be printed. The method includes repeating the selectively curing, actively cooling, separating and raising steps until the part is printed.

Another aspect of the present disclosure relates to a method for printing a 3D part in a layer-wise manner. The method includes providing a pool of polymerizable liquid in a vessel over a build window and positioning a downward-facing build platform in the pool, thereby defining a build region above the build window. The method includes selectively curing a volume of polymerizable liquid in the build region by imparting electromagnetic radiation through the build window to cause the polymerizable liquid to exothermically react and raise the temperature of the polymerizable liquid while forming a polymerized part layer that adheres to the build platform and the top surface of the optically transparent plate and actively cooling the build window to remove energy imparted by the electromagnetic radiation and the exothermic polymerization reaction of the polymerizable liquid such that the printed layer is between about 1° C. and about 30° C. below an average part temperature. The method includes separating the cooled printed layer from the top surface of the substantially optically transparent plate and raising the platen a height of a next layer to be printed. The method includes repeating the imparting, actively cooling, separating and raising steps until the part is printed.

Definitions

Unless otherwise specified, the following terms as used herein have the meanings provided below:

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis.

The term "providing", such as for "providing a monomer", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

DETAIL DESCRIPTION

Figure 1:
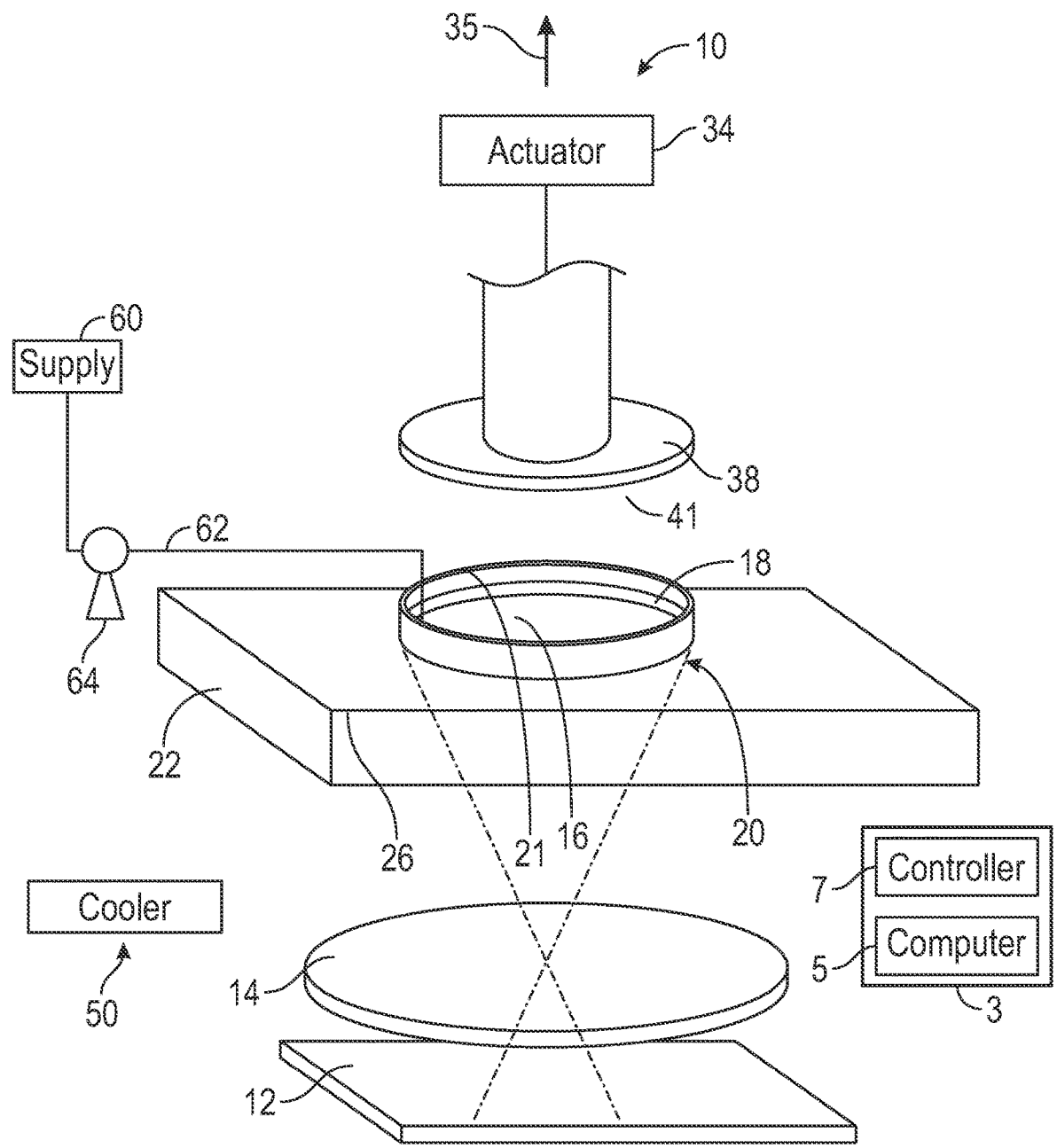
FIG. 1 is a schematic diagram of a stereolithography 3D printer with active cooling.
Figure 2:
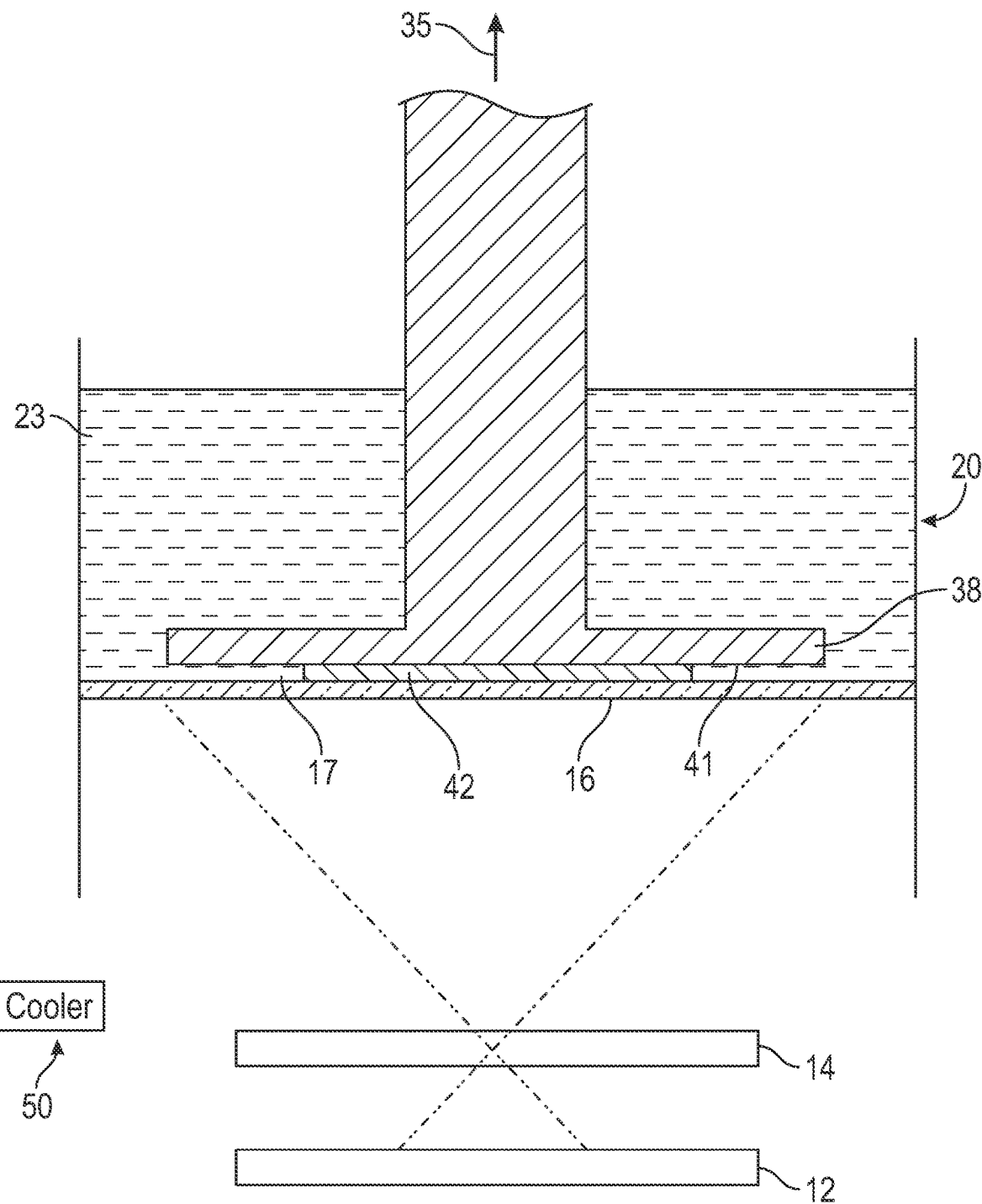
FIG. 2 is a schematic diagram of a layer being printed with the stereolithography 3D printer

The present disclosure relates to a bottom-up stereolithographic 3D printer that utilizes thermal management that results in a substantial energy balance in a layer-wise manner, as layers of a 3D part are printed. In one embodiment, substantially all of the energy imparted into a pool of liquid resin or the part being printed by the transmitted electromagnetic radiation or heat generated by the exothermic cross-linking reaction as a layer is formed during the printing process is removed using active cooling. As the layers of the part are printed in a space between a previously printed a layer and a window in a tank of polymerizable liquid, the active cooling is utilized on the window in the tank, due to the proximity of the window to the newly cross-linked layer on a layer by layer manner.

The active cooling can be any suitable cooling system that creates a sufficient temperature gradient between the printed layer and the surface of the substantially optically transparent window in contact with polymerizable liquid in the vessel. The active cooling can be continuous or transient. Continuous cooling will maintain an energy balance in a layer-wise manner with layer-wise cycling of temperature during the exothermic heating reaction and active cooling process.

However, in some embodiments transient or intermittent cooling can be utilized, which allows for larger temperature cycling in the polymerizable liquid and the layer of the part being printed while maintaining an overall average temperature in each layer, at the end of each thermocycle. The highest temperature portion of the thermocycle allows the polymerizable liquid to be heated to a higher temperature, increasing the overall reaction kinetics within the layer, which in turn increases the speed of printing a layer and improves the overall extent of reaction of the polymerizable liquid within the layer. The complete reaction of the monomer increases part quality through via improved strength and rigidity. After the layer is polymerized, the active cooling is activated to remove the localized heat imparted by the electromagnetic radiation and the exothermic reaction to reduce the localized temperature of the printed layer in the interstitial region between the window and the previously printed layer to a temperature to below that of the average part temperature. A typical temperature range of cooling below the average part temperature is between about 2° C. and 30° C. and more typically between about 5° C. and about 10° C. By utilizing a thermocycle to each layer application, the overall enthalpy of the part, and the vessel is maintained constant.

Once a build layer is cooled below the average part temperature, in one embodiment the active cooling of the window can be terminated. The localized layer temperature has reached the lower limit of the temperature thermocycle, allowing the exothermic heat to be removed, and thus, an overall enthalpy energy balance has been achieved so that the vessel temperature may be maintained substantially constant. The active cooling can be terminated just prior to or just after peeling the layer from the window such that as the layer is separated from the window and lifted, the polymerizable liquid can be flowed between the window and the previously printed layer, and the printing and cooling process repeated. Cooling of each newly formed layer increases removability from the window, as compared to removal done with no actively applied cooling. The active cooling of the window can be applied either directly onto the lower surface to perform cooling, or near the lower surface, utilizing radiant cooling.

The benefits of printing parts with energy balanced in a layer-wise manner includes the ability to print larger, thicker parts, printing parts at a faster build rate and the combination of printing larger, thicker part at a faster build rate. The larger, thicker parts and/or the increased printing rate is possible because heat does not accumulate or build up over time within the monomer pool or the part being printed. Additionally, because the printed layer is cooled to a temperature below the average part temperature, the printed layer is stiffer which aids in preventing defects as the layer is peeled from the window.

When the characteristic distance for heat transfer is short, temperature rise effects are ignorable. For typical layer deposition/curing times of about 10 seconds and a polymerizable liquid thermal diffusivity of about 150 mil2/second with a thermal diffusion distance of about 40 mils, means that part features less than 0.1" in cross section will experience adequate cooling from the surrounding unreacted resin. Additionally, convective cooling in to the unreacted resin occupying part voids will successfully transport heat away from the part build surface. If, however, there are portions of the part have thick walls or features, such as greater than about 1", heat can build significantly within those features, introducing thermal strain and causing layer and part distortion. Similarly, if the build climb rate is slow, such as about 10 mm per hour, the heat accumulation within the vat liquid and part layers might be ignorable. However, if the climb rate is fast, such as about 10 mm per minute, the temperature rise at the part build surface may be unacceptably high.

By way of example, a typical thin layer, 25 μm (0.025 mm)-100 μm (0.1 mm), is cured in a timeframe of about 10 to 90 seconds, where the imparted energy and heat of reaction are dissipated from the vat through passive cooling through contact with the vat and polymerizable liquid. By applying active cooling, larger and thicker parts can be printed at a faster rate such as between 5 and 10 seconds while still maintaining a constant part, polymerizable liquid and system temperature. Additionally, due to the high thermal conductively of the window material, such as quartz or sapphire, the heat/energy held by the polymerized layer is removed in a short amount of time, such as for instance, about 1 second or less. As such, the active cooling aids in increasing the printing speed of each layer in the part.

Referring to FIG. 1, an exemplary 3D printer for use with the present invention is illustrated as DLP system 10. The DLP system 10 includes a digital light projector 12 which projects electromagnetic radiation, such as UV light, in a pattern based upon a geometry of a sliced layer of a 3D digital model to an imaging lens 14. An alternative to the imaging lens 14 is a mirror. The imaging lens 14 directs the projected optical stimulation through a window 16, a substantially optically transparent plate, that may form a portion of a bottom wall 18 of a vessel 20. The vessel 20 has an interior cavity 21 configured to retain a pool 23 of a photocurable liquid that is reactive with the introduced electromagnetic radiation, where the vessel 20 is retained on a support member 22.

The system 10 includes an actuator 34 that moves a build platform 38 in the z direction as indicated by arrow 35. The build platform 38 is configured to adhere to polymerized material during the initial building of the part using the DLP printing process. At the beginning of the printing processes, at least a bottom surface 41 of the build platform 38 is submerged in the pool 23 of the liquid resin above the window 16. An interstitial region is created between the build platform 38 and the interior cavity 21 of the vessel 20, and resin filling this region is cured to form a layer of the part through a polymerization process initiated by imaging the electromagnetic radiation through the window 16. When the resin in the interstitial region is cured, an initial formed layer of a 3D part 42 bonds to the build platform 38 and the window 16.

Once the layer is formed, an active cooling device 50 is utilized to remove the heat imparted by the electromagnetic energy through the window 16 and the heat generated by the exothermic cross-linking reaction of the photopolymerizable liquid resin, to bring the topmost layer of the part being printed to a temperature below the bulk part temperature. The active cooling device 50 selected can utilize conduction, radiation or convention cooling and can be continuous or transient in nature.

By applying a desired level of cooling action to the topmost layer just completing its polymerization step, the extent of cooling applied may be controlled in order to create a temperature wave, or thermocycle, within the topmost layer to force it to fluctuate between a chilled state after cooling is applied, and a warm state when the most recent exotherm has occurred. Knowing the extent of heat generation for a particular polymerizable liquid can allow one to calculate and apply an extent of cooling equal to and opposite that of the heat generation step, in order to maintain an overall average constant part temperature in the vat. This enthalpy balance can be achieved using a thermal gradient, where the bottom surface of the window 16 is cooled to draw the exothermic heat energy through the window 16 and into either ambient conditions or into a cooling system. In DLP printing systems which operate slowly to print small parts such as 1" items, passive cooling of an individual part layer in the vat occurs naturally at ambient conditions. However, when the layers of larger parts are polymerized, or if layer polymerizations occur at a quick rate such as one layer per second, the layer temperature and polymerizable liquid temperature in the vat will increase to an unacceptable level; without active cooling of each layer (and not of the overall polymerizable liquid resin and vat temperature), build rate would need to be reduced in order to maintain the overall part temperature to an acceptable level where parts would not soften and unacceptably deform.

The temperature of the cooled layer 42 is reduced to several degrees below the desired average part temperature, typically between about 1° C. and about 30° C. below the desired average part temperature, and more typically between about 5° C. and about 10° C. below the average part temperature, in order to effectively apply an active thermocycle and maintain vat and part temperature. The formed layer is then removed or lifted from the window 16 using a separation technique (e.g., peeling) as are known in the art, and typically including moving the build platform 38 in the x, y, and/or z directions away from the window 16.

Once the layer is removed from the window 16, the actuator 34 raises the part build platform 38 to the increment of a height of a layer, which allows nearby polymerizable liquid to again fill the interstitial region between the previously printed layer and the window 16. The pattern of electromagnetic radiation causes the curing, or polymerization reaction, of the photocurable liquid, resulting in a successive layer of the 3D part being formed. The layer-by-layer processing of printing, removing and raising is continued until the 3D part is fully formed.

A chilled layer is more readily separated from the window 16 relative to a hotter layer due to the increased mechanical properties of the chilled layer. In order to begin the next layer, in one embodiment the active cooling device 50 is deactivated just prior to flowing a new amount of polymerizable liquid into the build space, to allow the photopolymerizable liquid to be available for curing and the next exotherm. Because the reaction kinetics of the polymerization increase exponentially with an increase in temperature, the ability of the layer to react in a non-cooled state allows for faster and more thorough cross-linking in each layer. Thus, the need for the high temperature portion of the thermocycle.

Application of the pattern of optical stimulation on each layer causes the polymerization reaction with the polymerizable liquid results in the development of the exotherm which requires heat removal. After each layer is formed, the active cooling and lifting steps are repeated to continue the layer-wise thermocycling. The layer-by-layer processing of printing, actively cooling, peeling and raising is continued until the full 3D part is formed.

As the build continues, the pool 23 of the polymerizable liquid is depleted by the creation of successive layers of the 3D part 32. The SL based system 10 may include a means to refill the vat with an additional polymerizable liquid supply 60 to the vessel 20 through a conduit 62. The supply 60 can be elevated relative to the vessel 20 such that head pressure can be utilized as the driving force to supply polymerizable material to the vessel 22. Alternatively, a pump 64 can be utilized to supply the necessary pressure to replenish the polymerizable liquid in the vessel 20.

The system 10 also includes a controller assembly 3, which may include one or more control circuits (e.g., a controller 7) and/or one or more host computers (e.g., a computer 5) configured to monitor and operate the components of the system 10. For example, one or more of the control functions performed by the controller assembly 3, such as performing move compiler functions and emitting light or optical stimulation; active cooling can be implemented in hardware, software, firmware, and the like, or a combination thereof; and may include computer-based hardware, such as data storage devices, processors, memory modules, and the like, which may be external and/or internal to the system 10.

The controller assembly 3 may communicate over a communication line with the projector 12, the actuator, and various actuators, sensors, calibration devices, display devices, and/or user input devices that are described with respect to the system 10 or other systems disclosed herein. The controller assembly 3 can communicate with the various devices using electrical, optical, and/or wireless signal lines, which may be external and/or internal to system 10, allowing controller assembly 3 to communicate with various components of system 10.

Figure 3:
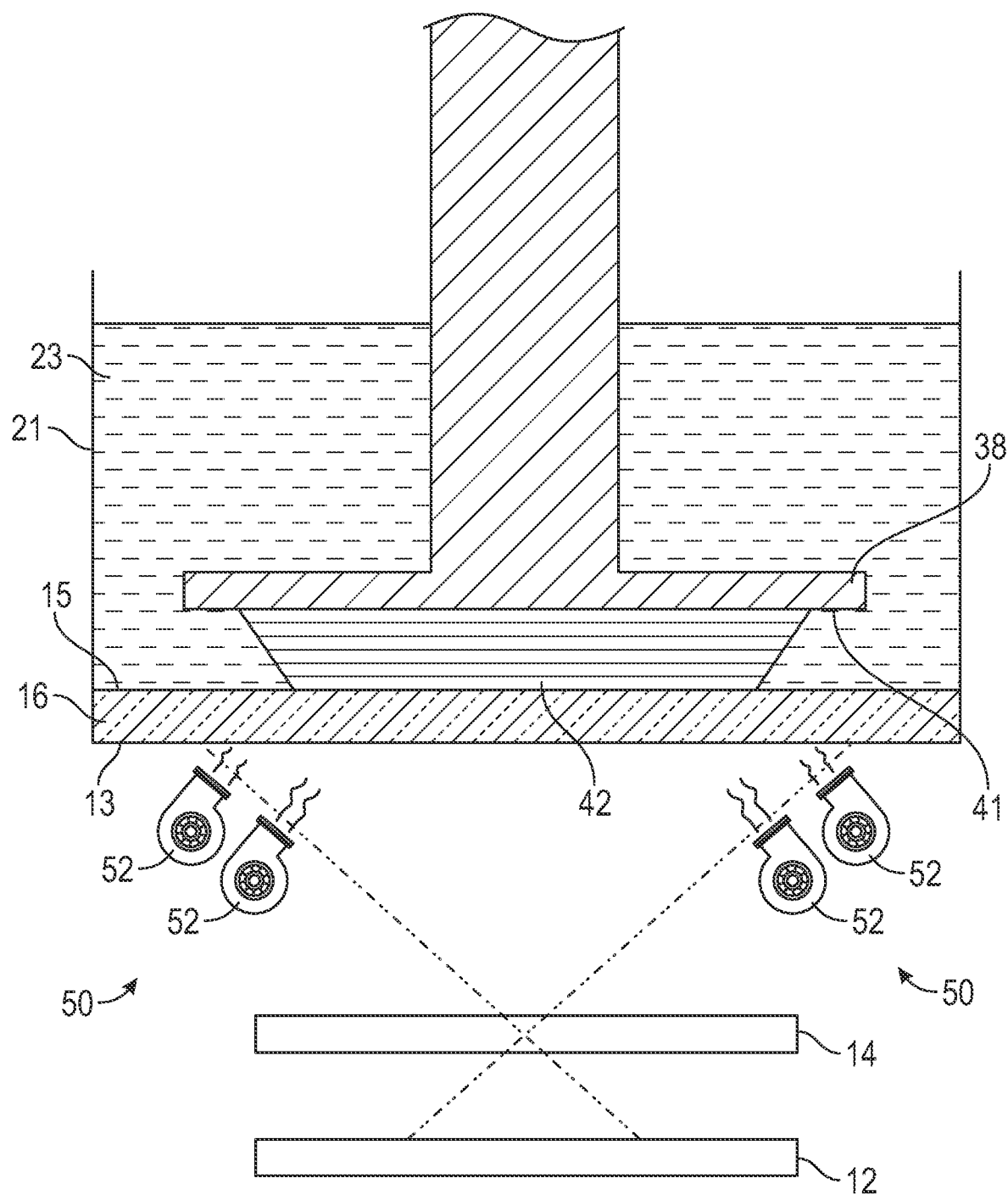
FIG. 3 is a schematic diagram of a stereolithography printer utilizing air knives for active cooling.

Referring to FIG. 3, the active cooling device 50 is illustrated as air knives 52 that force ambient air or chilled air towards the bottom surface 13 of the window 16. The air knives cause a temperature gradient from the printed layer and the bottom surface 17 of the window 18 which drawings energy from the printed layer and the pool of photopolymerizable liquid to ambient conditions cause the energy balance on the layer-by layer manner. Air knives 52 are useful for transient or intermittent convective cooling after the layer has been formed, where the air knives are deactivated slightly prior to or just after the start of the peeling process.

Figure 4:
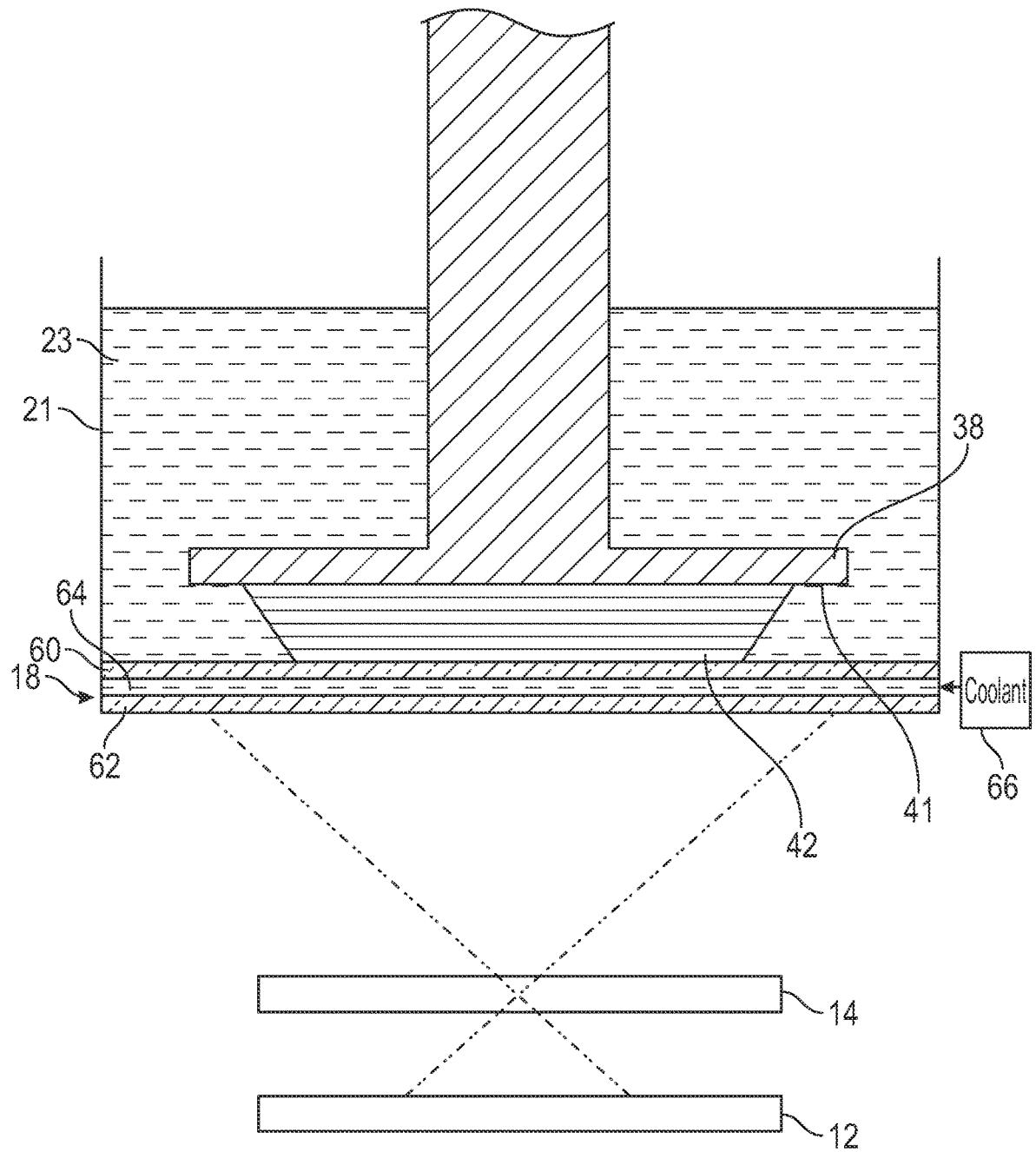
FIG. 4 is a schematic diagram of a stereolithography printer utilizing a cooling fluid for active cooling.

Referring to FIG. 4, the active cooling device 50 is illustrated as a continuous convention cooling system. The window 16 can be a dual pane 60 and 62 with a gap 64 that allows a coolant 66 to be circulated below the printed layer 42 to remove and balance the energy on a layer-by-layer process. The coolant can be refrigerated and recirculated to cool the window 60 so that, just before the exposure phase of the build cycle, the window 60 is below the part build temperature. The exothermic curing process will raise both the part build surface and the adjacent portion of the window 60 above the part build temperature. A coolant such as a Freon or chilled water with low UV absorption and a near-index-match to the window 60 material, pumping refrigerated Freon or water through the window would effectively remove heat.

Figure 5:
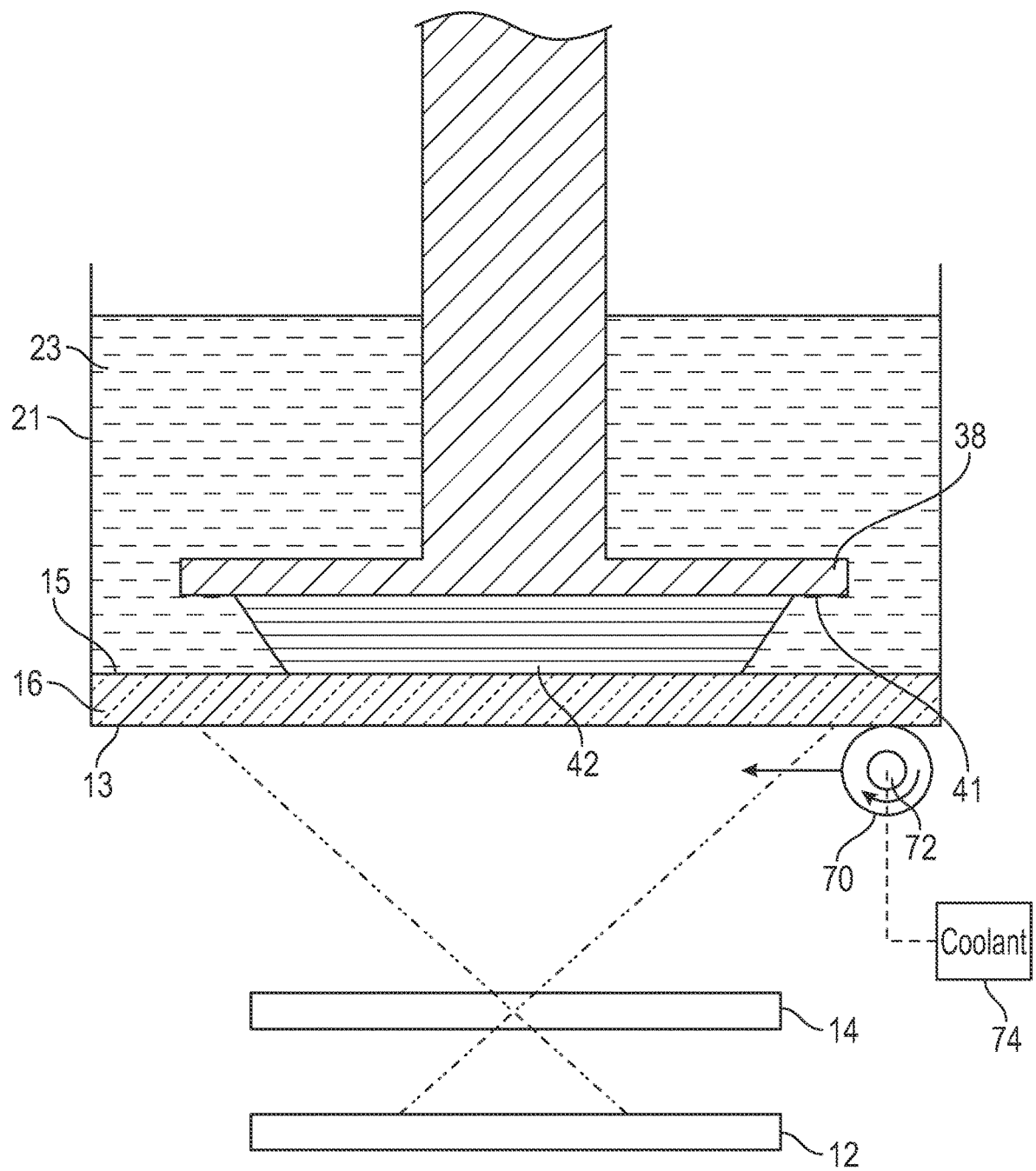
FIG. 5 is a schematic diagram of a stereolithography printer utilizing a chilled roller for active cooling.

Referring to FIG. 5, the active cooling device 50 is illustrated as a transient conduction cooling system where the bottom surface 13 of the window 16 can be periodically contacted with a cold surface. By way of example, a roller 70 roller with coolant 74 traveling in the axle 72 can be rolled along the bottom surface 13 where the roller is substantially below the part build temperature and brings the window 16 to temperature below the average part temperature for a portion of the layer cycle. An exemplary roller 70 is a rubber roller with metal particles, such as copper particles.

Figure 6:
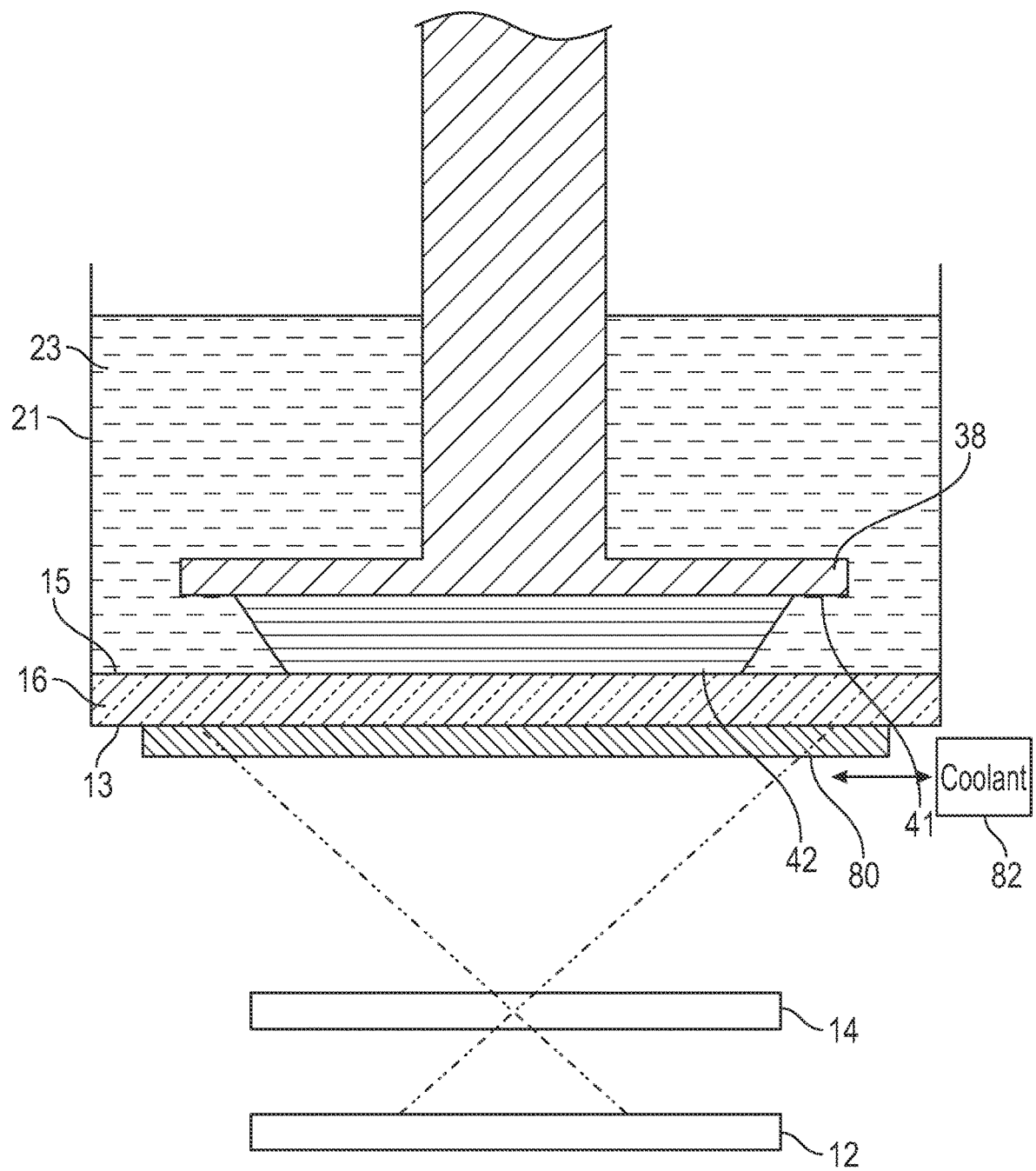
FIG. 6 is a schematic diagram of a stereolithography printer utilizing a chilled plate for active cooling.

Referring to FIG. 6, the active cooling device 50 is illustrated as another transient conduction system. The active cooling device 50 includes a metal sheet or shutter 80 that alternates between a retracted state in contact with a cold reservoir 82 and an extended state (illustrated in FIG. 6) where the sheet is adjacent to the bottom surface 13 of the window 16. The sheet metal or shutter 80 can be utilized to chill the window after an exotherm, and maintain constant temperature of the overall DLP system. Another alternative is one or more hinged plates that can be positioned to tile in contact with the window, or can pivot away from the window to contact cold surfaces.

Figure 7:
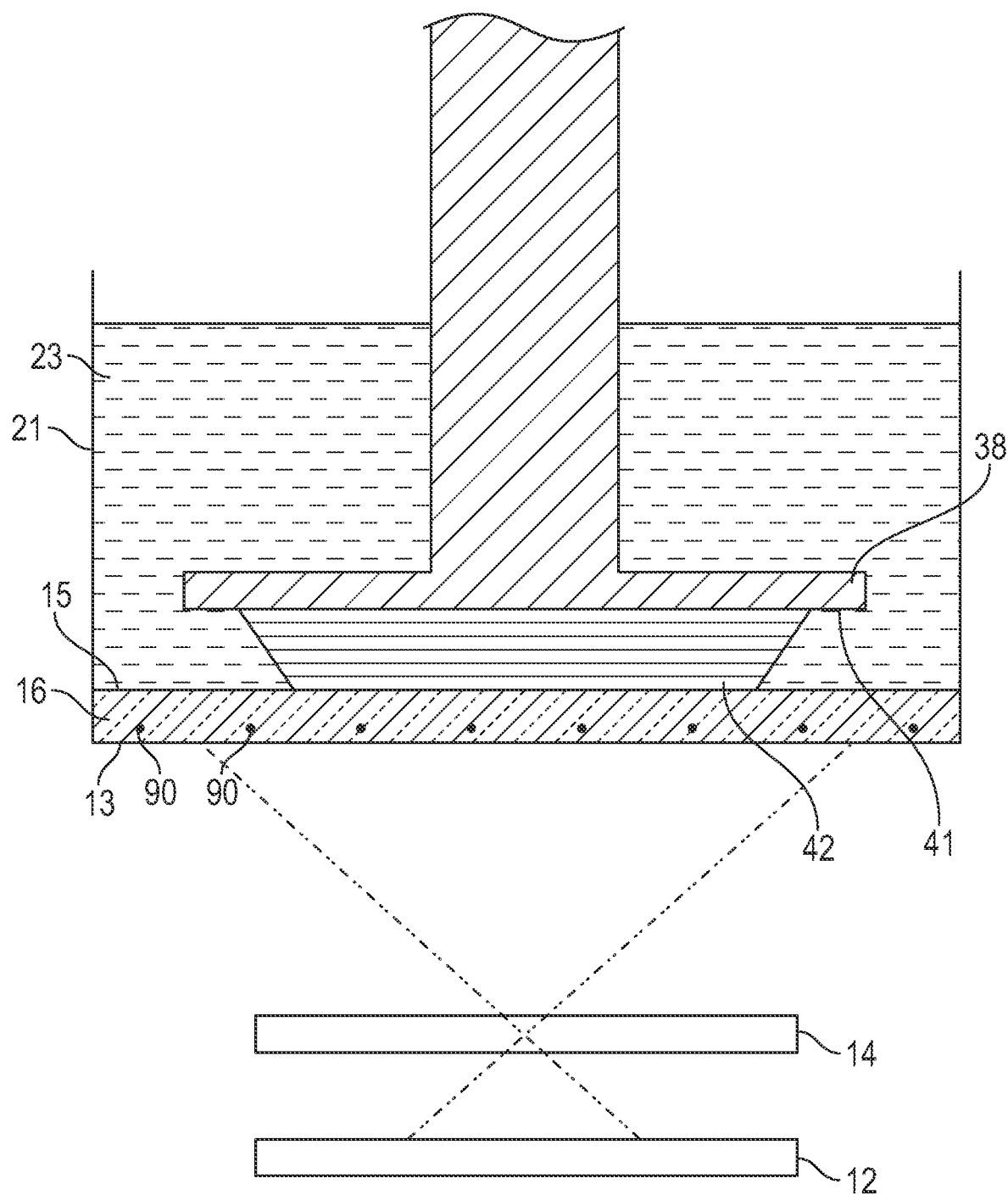
FIG. 7 is a schematic diagram of a stereolithography printer utilizing 1-D strands or ribbons within the window for active cooling.

Referring to FIG. 7, the active cooling device 50 is illustrated as a continuous conduction cooling system. The thermal properties of most UV-transparent materials (glass, quartz, polymers) makes this insufficient for fast builds over large areas. The active cooling device 50 includes embedding 1-D heat conducting threads or substantially vertical ribbons 90 into the window 16 to conduct heat away from the part being printed using conduction. Due to the expansion of the material during cross-linking the area of optical energy blocked by the heat conducting threads or substantially vertical ribbons is minimal and will not affect part quality. An exemplary, but non-limiting material for the 1-D heat conducting threads or substantially vertical ribbons is pyrolytic graphite.

Figure 8:
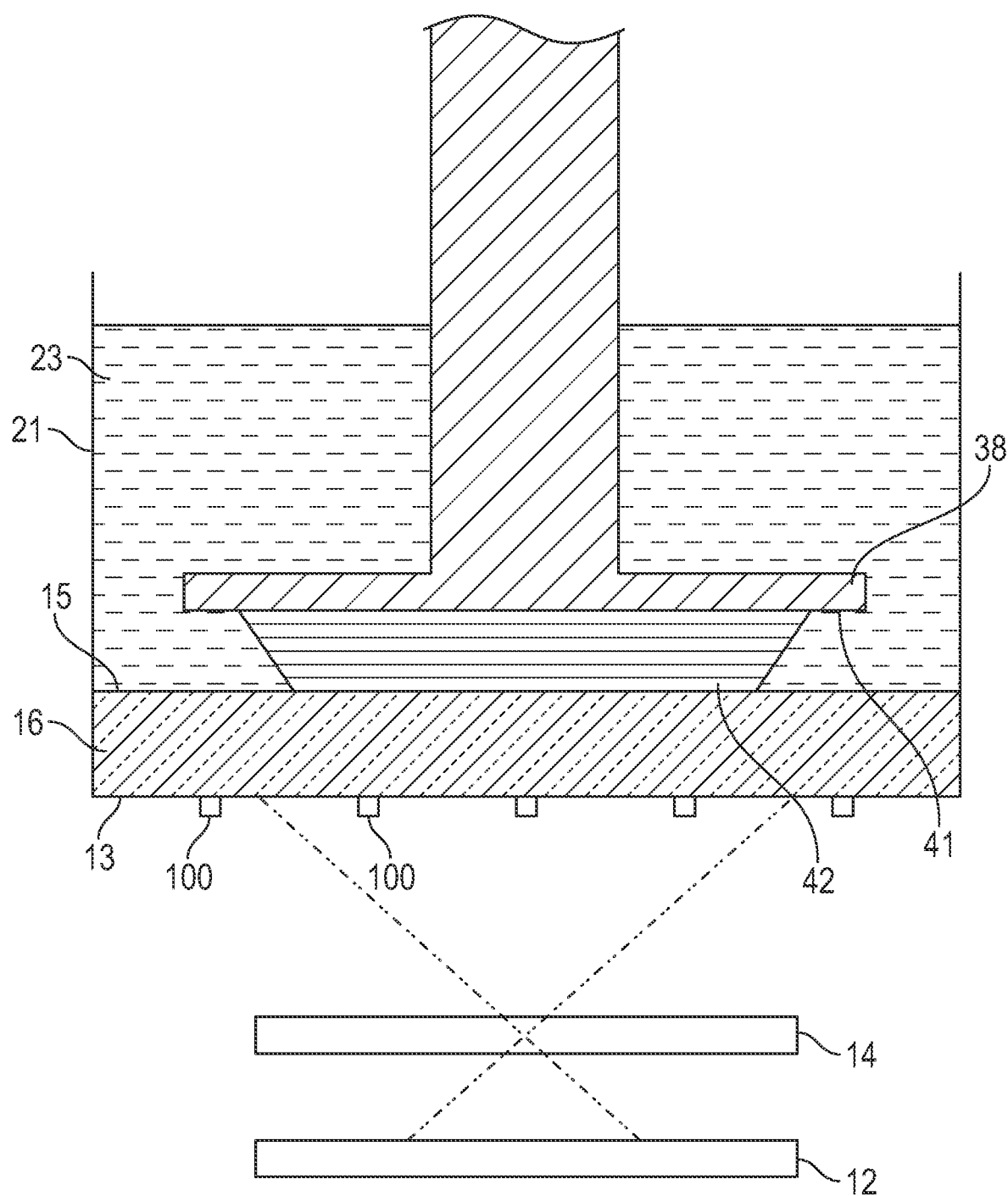
FIG. 8 is a schematic diagram of a stereolithography printer utilizing thermoelectric devices for active cooling.

Referring to FIG. 8, the active cooling device 50 is illustrated as another transient conduction system. The window 16 is thicker than in other embodiments where the bottom surface 13 is out of focus. An array of thermoelectric devices 100 are attached to the bottom surface 13 of the window 16 and can extract heat from the window 16 to maintain an enthalpy balance, and thus maintain a constant average part temperature in a layer-wise thermocycling manner.

Figure 9:
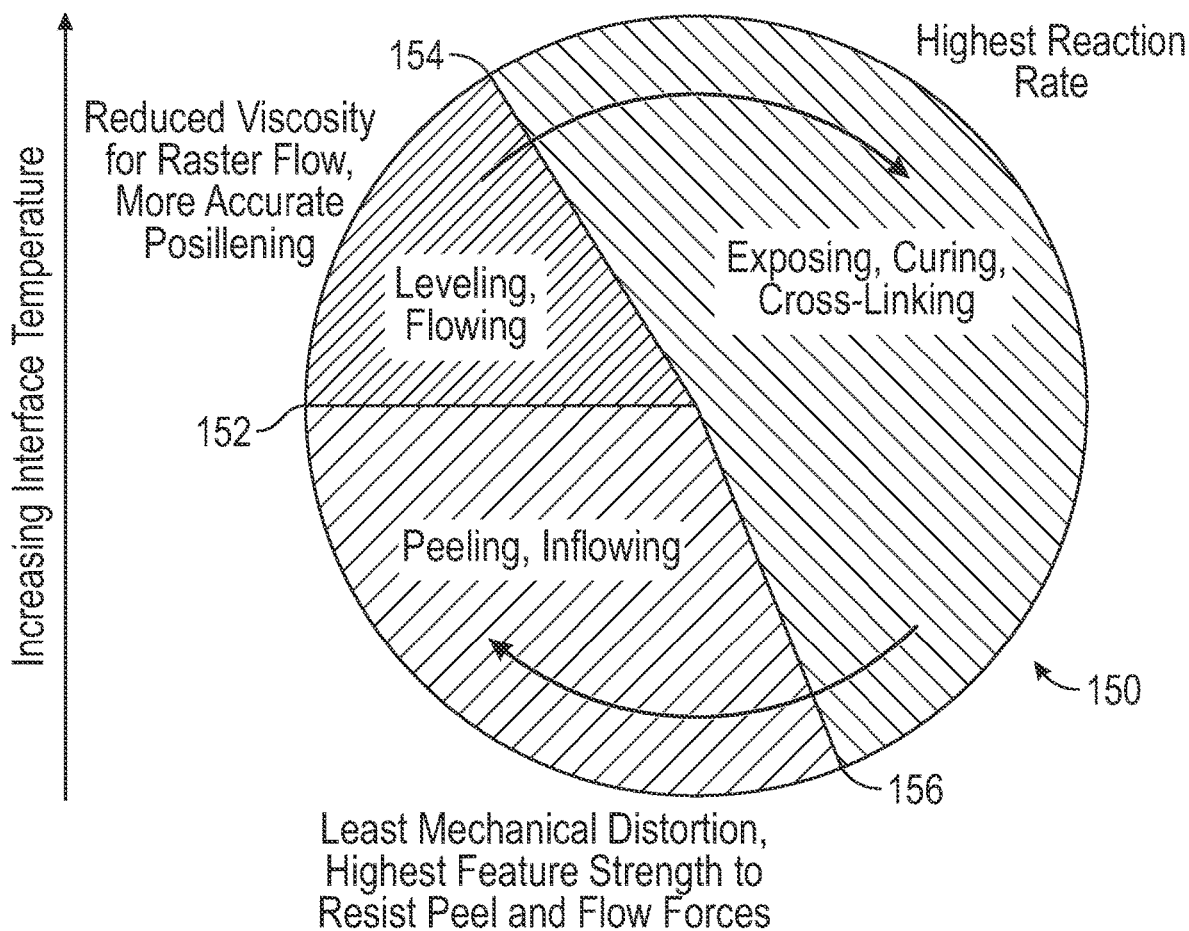
FIG. 9 is a diagram of a thermal cycle for a printing layer in stereolithography 3D printer.

Referring to FIG. 9, an exemplary thermal cycle for printing a layer and peeling a layer from the window is illustrated at 150. Beginning at point 152 of the cycle, the last printed layer has been peeled from the window and polymerizable liquid is flowing and leveling between the last printed layer and the window. As the polymerizable liquid is flowing and leveling, the localized temperature in the build space is raised by deactivating the cooling step, which decreases localized polymerizable liquid viscosity and increases the reaction rate in the localized build space (which is exponentially related to temperature). At step 154 the electromagnetic radiation is imparted into the vessel which causes the exothermic cross-linking reaction to occur. The maximum temperature is reached during the cross-linking curing step. After the layer is cured, the temperature of the new layer is reduced to a temperature below the average part temperature, and the peeling process is started at point 156. The temperature is at a minimum during the peeling process to provide rigidity to the layer being peeled from the plate. Once the layer is peeled, the cyclical process repeats until the part is printed.

Although the present disclosure has been described with reference to preferred embodiments, workers skilled in the art will recognize that changes may be made in form and detail without departing from the spirit and scope of the disclosure.

The invention claimed is:

1. A method for printing a 3D part in a layer-wise manner, the method comprising the steps of:
providing a pool of polymerizable liquid in a vessel over a build window;
positioning a downward-facing build platform in the pool, thereby defining a build region above the build window;
selectively curing a volume of polymerizable liquid in the build region by imparting electromagnetic radiation through the build window to form a printed layer of the part with a polymerization reaction, wherein the printed layer is adhered to the build platform;
actively cooling the build window to remove energy imparted by the electromagnetic radiation and the polymerization reaction of the polymerizable liquid such that the printed layer is between about 1° C. and about 30° C. below an average part temperature, wherein the active cooling is transient and is performed after the selectively curing step;
separating the cooled printed layer from the top surface of the build window;
raising the build platform to a height of a next layer to be printed; and
repeating the selectively curing, actively cooling, separating and raising steps until the part is printed.

2. The method of claim 1, wherein the actively cooling step reduces the temperature of the printed layer to between about 5° ° C. and about 10° ° C. below the average part temperature.

3. The method of claim 1, wherein the active cooling utilizes conduction.

4. The method of claim 1, wherein the active cooling utilizes convection.

5. The method of claim 1, wherein the active cooling comprises utilizing air knives imparting a flow of a gas on a bottom surface of the window.

6. The method of claim 1, wherein the active cooling comprises utilizing a flow of a cooling fluid between spaced apart panes of the build window.

7. The method of claim 6, wherein the cooling fluid comprises water or Freon.

8. The method of claim 1 wherein the active cooling comprises utilizing a chilled roller contacting a bottom surface of the build window.

9. The method of claim 8, wherein the chilled roller comprises a rubber roller with metal particles.

10. The method of claim 1, wherein the active cooling comprises utilizing a metal plate or shutter contacting a bottom surface of the build window.

11. The method of claim 1, wherein the active cooling comprises utilizing a plurality of thermally conductive 1-dimensional strands or substantially vertical ribbons embedded in the build window to conduct heat from the printed layer.

12. The method of claim 1, wherein the active cooling comprises utilizing one or more thermoelectric devices contacting a bottom surface of the build window to conduct heat from the printed layer.

13. A method for printing a 3D part in a layer-wise manner, the method comprising:
providing a pool of polymerizable liquid in a vessel over a build window;
positioning a downward-facing build platform in the pool, thereby defining a build region above the build window;
selectively curing a volume of the polymerizable liquid in the build region by imparting electromagnetic radiation through the build window to cause the polymerizable liquid to exothermically react and raise the temperature of the polymerizable liquid while forming a polymerized part layer that adheres to the build platform and the top surface of the build window;
actively cooling the build window to remove energy imparted by the electromagnetic radiation and the exothermic polymerization reaction of the polymerizable liquid such that the polymerized part layer is between about 1° C. and about 30° C. below an average part temperature, wherein the active cooling is transient and is performed after the selectively curing step;
separating the cooled polymerized part layer from the top surface of the build window;
raising the downward-facing build platform a height of a next layer to be printed; and
repeating the imparting, actively cooling, separating and raising steps until the part is printed.

14. The method of claim 13, wherein the actively cooling step reduces the temperature of the printed layer to about 5° C. below the average part temperature.

15. The method of claim 13, wherein the active cooling utilizes conduction.

16. The method of claim 13, wherein the active cooling utilizes convection.

17. The method of claim 13, wherein the active cooling comprises utilizing air knives imparting a flow of a gas on a bottom surface of the build window.

18. The method of claim 13, wherein the active cooling comprises utilizing a flow of a cooling fluid between spaced apart panes of the build window.

19. The method of claim 18, wherein the cooling fluid comprises water or Freon.

20. The method of claim 13, wherein the active cooling comprises utilizing a chilled roller contacting a bottom surface of the build window.

21. The method of claim 20, wherein the chilled roller comprises a rubber roller with metal particles.

22. The method of claim 13, wherein the active cooling comprises utilizing a metal plate or shutter contacting a bottom surface of the build window.

23. The method of claim 13, wherein the active cooling comprises utilizing a plurality of thermally conductive 1-dimensional strands or substantially vertical ribbons embedded in the build window to conduct heat from the printed layer.

24. The method of claim 13, wherein the active cooling comprises utilizing one or more thermoelectric devices contacting a bottom surface of the build window to conduct heat from the printed layer.

* * * * *